United States Patent [19]

Tsui

[11] Patent Number: 5,701,836
[45] Date of Patent: Dec. 30, 1997

[54] APPARATUS FOR REMOVING A VACUUM BAG OF A SHIP STERN

[76] Inventor: I-Hua Tsui, P.O. Box 90, Tainan 704, Taiwan

[21] Appl. No.: 798,777

[22] Filed: Feb. 11, 1997

[51] Int. Cl.[6] .................................................. B63B 1/34
[52] U.S. Cl. ................................ 114/67 A; 114/56
[58] Field of Search ..................... 114/67 R, 67 A, 114/56, 289–291, 271

[56] References Cited

U.S. PATENT DOCUMENTS

| | | | |
|---|---|---|---|
| 688,672 | 12/1901 | Niemeyer | 114/271 |
| 1,005,698 | 10/1911 | Dillon | 114/67 A |
| 1,093,692 | 4/1914 | Gawley | 114/67 A |
| 1,254,892 | 1/1918 | Elniff | 114/67 A |

Primary Examiner—Ed L. Swinehart

[57] ABSTRACT

A device for removing a vacuum bag from a ship stern includes a passageway and plural valve units fixed in holes of an outer wall of the stern. The passageway is formed by air entrances in a rear deck, and a space between an inner wall and an outer wall of the stern is divided into plural sections with vertical support plates bored with air holes, and holes bored in the outer walls of the stern. Each valve unit is fixed with each of the holes, normally closing the hole and opening it when the speed of water filling the vacuum bag is slower than the speed of a moving ship enabling open air to flow into the vacuum bag just behind the stern.

5 Claims, 6 Drawing Sheets

APPARATUS FOR REMOVING A VACUUM BAG OF A SHIP STERN

BACKGROUND OF THE INVENTION

This invention relates to a method for removing a vacuum bag of a ship stern and its device, particularly to a method and its device to induce a vacuum bag to happen as soon as possible and to remove it by forcing air to flow into it so that a ship may be moved with a speed faster than the conventional maximum.

When a common large ship A navigates on water with a high speed as shown in FIGS. 1 and 2, its stern A1 leaves a lateral cross-sectional 3 D vacuum space in the water after its body moves forward. Then water at both sides and under the 3 D vacuum space at once flows into the vacuum space because of gravity. Therefore, if the speed of the ship is slower than this automatic filling speed, a vacuum bag G just behind the stern may not happen, since the space will be filled immediately. On the contrary, if the ship speed is faster than the automatic filling speed, the three dimensional (3 D) space behind the stern A1 may not be filled completely by water, creating a vacuum bag G. As the ship body is mobile and water is stationary, the 3 D space not yet filled with water becomes a vacuum space having a front end sucking the stern A1 to form a pulling force in an opposite direction to the moving direction of the ship. Then the ship cannot obtain a speed in proportion to the propelling force, with a strong accelerating force of the ship being reduced by the growing pulling force of the vacuum. So far the maximum navigating speed possible for ships is generally known to be around 45 knots.

The shape of a vacuum bag G behind a stern my be assimilated to look like a trumpet with its outer end sucking at the wall of the stern, which outer end may be shaped different according to the shape of a stern A1. For example, for a stern A1 having straight line with two dull corners shown in FIGS. 1 a vacuum bag G may happen faster than with a semi-round stern, and for a stern shaped as a spoon handle shown in FIG. 3, a vacuum bag G may happen the slowest.

If a vacuum bag G happens when a ship with the dull stern moves at the speed of 10 knots, a ship with the round stern may have a vacuum bag G at the speed of 15 knots, and a ship with a spoon-handle-shaped stern may have a vacuum bag G at about 20 knots. Therefore, modem shipbuilding engineering aims to design ships with the spoon-handle-shaped stern so as to put off the time of happening of a vacuum bag G. But the speed of 45 knots is still the maximum navigating speed for ships, in spite of experiments of ships with high speed in a stationary ponds.

SUMMARY OF THE INVENTION

A main purpose of this invention is to offer a method and its device for removing a vacuum bag of a ship stern, enabling ships to navigate with a speed surpassing the present maximum navigating speed, 45 knots.

The main feature of the invention is an air passageway provided in a stern and plural valve units fixed with plural holes in an outer wall of the stern so that open air may flow through the passageway and the holes opened by the valves. The air passageway includes air entrances provided in an upper surface of a rear deck, a space between an inner wall and the outer wall of the stern divided with plural vertical plates into plural sections.

Another feature of the invention is a sloped stop wall extending rearward from the stern bottom of a ship.

BRIEF DESCRIPTION OF DRAWINGS

This invention will be better understood by referring to the accompanying drawings, wherein.

DESCRIPTION OF THE PREFERRED EMBODIMENTS

Figure 1:
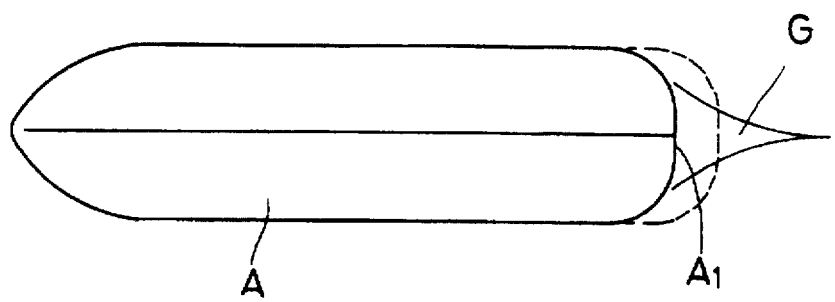
FIG. 1 is an upper view of the known location of a vacuum bag happening behind a shop stern.
Figure 2:
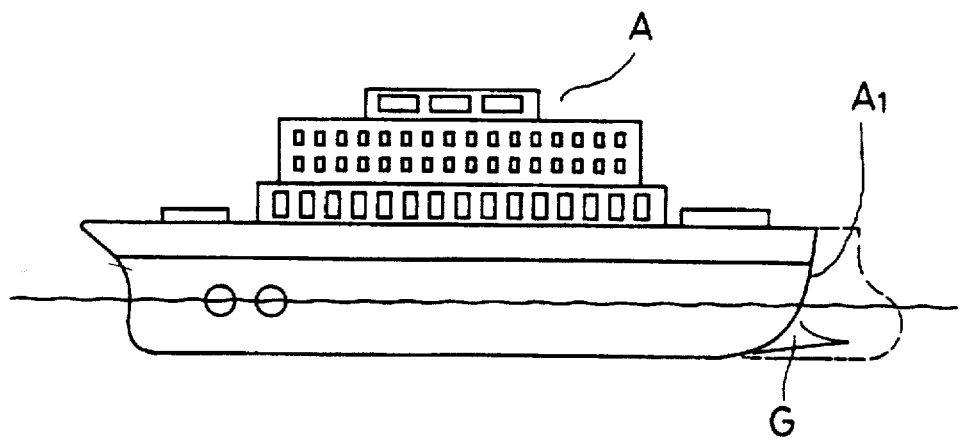
FIG. 2 is a side view of the shape of the known vacuum bag happening behind a ship stern.
Figure 3:
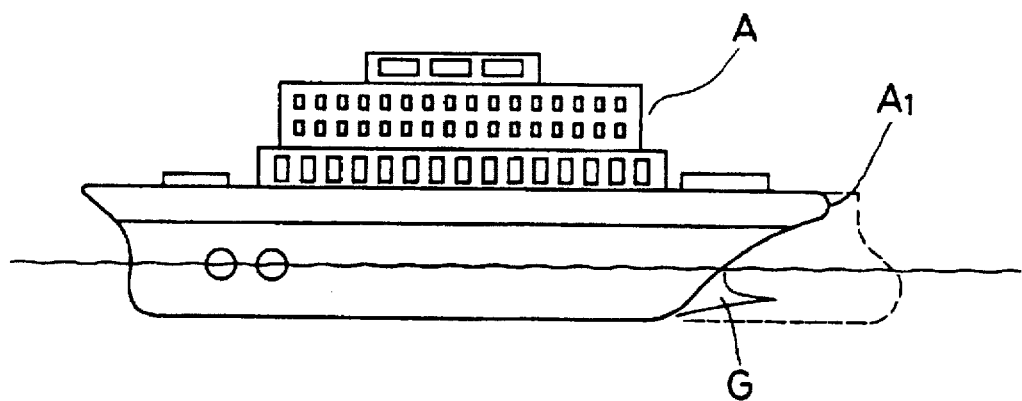
FIG. 3 is a side view of the shape of the known vacuum bag happening behind a spoon-handle-shaped ship stern.

A first preferred embodiment of a method for removing a vacuum bag of a ship stern in the present invention, is to be described below, referring to the drawings.

In order to understand the method for removing a vacuum bag of a ship stern, an outline of some theory will be better presented.

1. A speed of water filling three dimensions space which is left behind a ship stern by a moving ship is called an automatic filling speed. Water is a fluid having a weight, and if there happens to be a hole or a hollow space in water, it will immediately fill the hole or the hollow space because of gravity of water. The flowing speed for filling all the hollow space is dependent on the size and depth of the hollow space. Therefore, as each ship has different depth of draught and the shape of its stern A1, each has a different automatic filling speed.

2. A lateral three dimensional space is not a definite dimension on a water surface coordinate point, but continually changes with time moving forward as a ship moves forward, and this space is called consecutive three dimensional space, which is produced in a water body following behind the ship stern A1 by a fast moving ship, forming white bubbles following the ship stern A1. This condition is caused by automatic filling function, not a true phenomena of the lateral three dimensional space of the ship body.

3. A vacuum bag happening behind a ship stern. If the balance of the automatic filling speed minus ship speed is a plus, a vacuum bag G never happens behind the ship stern A1. If the balance is a minus, a vacuum bag G happens. This vacuum bag G is actually a trumpet-shaped sucking plate having a pull force in an opposite direction to the ship moving direction. The larger the propelling force of the ship is, the larger the pull force of the vacuum bag is.

4. The maximum navigating speed. After the navigating speed of a large ship A exceeds the speed of a vacuum bag, the propelling force of the ship A will be offset by the opposite pull force of the vacuum bag G. If the speed of the ship reaches more than 45 knots, the ship will be ripped to pieces by the propelling force, so 45 knots is the maximum navigating speed for a ship at present.

5. A large ship A. A large ship A navigating on the water surface is different from those navigating under the water surface and those having a far smaller proportion of gross tonnage to propelling force than ships of a large propelling force, such as hydrofoil crafts, hover crafts, air turbine ships, small race boats, etc.

6. A hollow stern. In the time when a ship A is navigating with a high speed, if a large portion of the pull force of the vacuum bag is eliminated by a method of air flowing according to the invention, the speed of the ship A may easily be accelerated and water filling current cannot reach the wall of the ship stern before the ship A moves forward. Consequently, the ship stern will be completely exposed in the air of a three dimensional space, and a vacuum bag G does not happen behind the ship stern under that speed, and then the propelling force augmented can obtain an accelerated speed in proportion to the stabilized propelling force.

As a vacuum bag G arises behind a ship stern A1, it produces a sucking force against the wall of the ship stern, functioning as an opposite force against the navigating force of the ship, and the counter force of the vacuum bag G will grow larger and larger in proportion to the augmented propelling force of the ship. So a vacuum condition of the vacuum bag G has to be removed in order to eliminate the sucking force of the vacuum bag G by permitting the sucking plate to suck in air automatically. Then, the vacuum condition of the sucking plate may be gotten rid of by air filling therein, thereby losing the sucking force. Therefore, if air is supplied in the area of the vacuum bag G behind the ship stern A1, forcing the vacuum bag G to lose its vacuum, the sucking plate will change into a mass of bubbles, removing the pull force in an opposite direction to the navigating direction of the ship.

Figure 4:
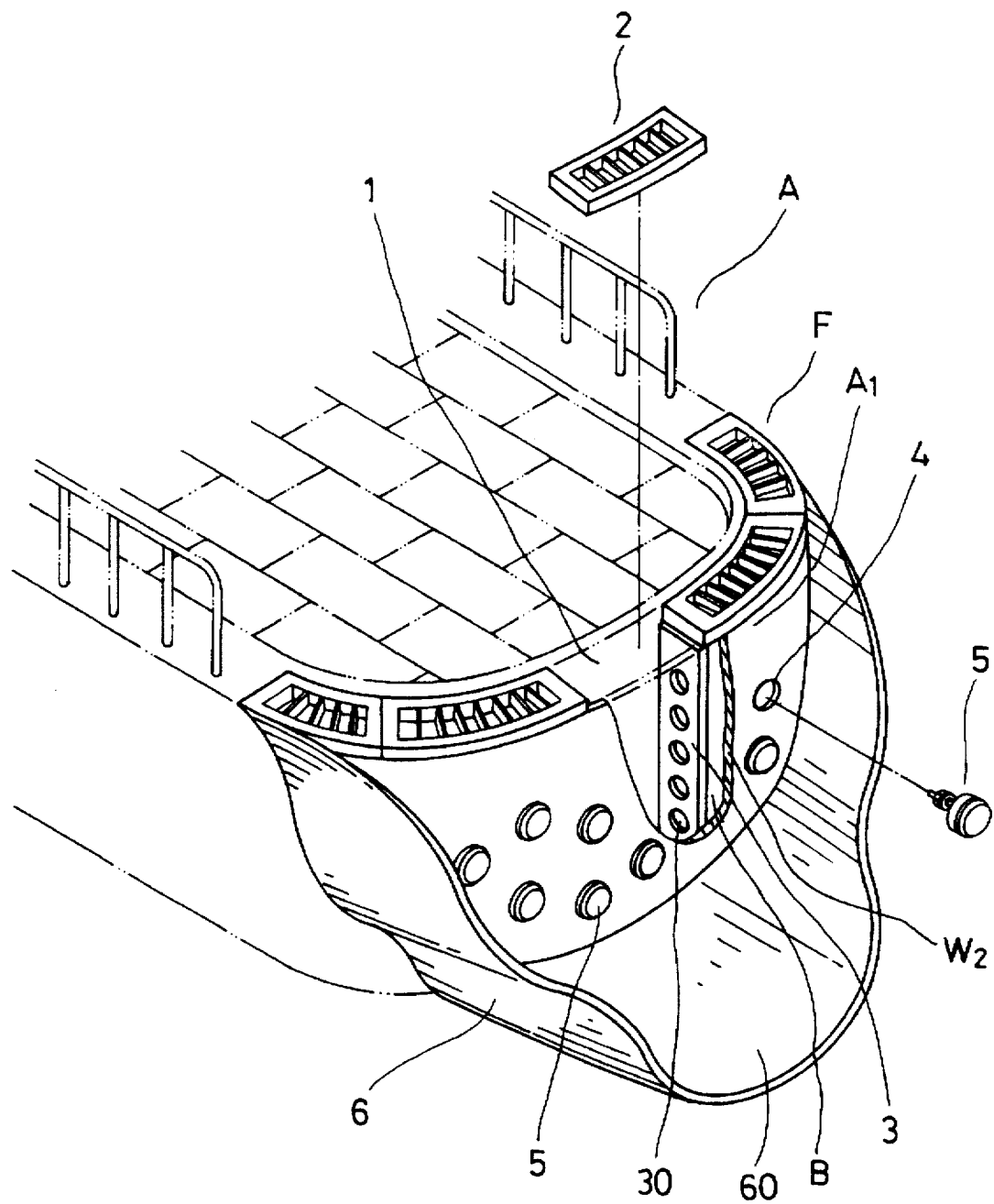
FIG. 4 is a perspective view of a first preferred embodiment of a removing device for an vacuum bag happening behind a ship stern in the present invention.

A first preferred embodiment, based on the method described above, of a device for removing a vacuum bag arising behind a ship stern in the present invention, as shown in FIGS. 4, 5, 6 and 7, includes a passage R, which is a channel for guiding air on the water surface into the vacuum bag G. Referring to FIG. 4, a plurality of air entrances 1 are formed in a rear deck F of a ship stern A1, and the same number of sucking windows 2 as the air entrances 1 are fitted in the air entrances 1. Further, a plurality of support vertical plates 3 are set in a space B formed between an inner wall W1 and an outer wall W2, forming several separated sections for making up the passage R or the channel so as to secure the passageway in the space B and reinforcing the inner wall W1 and the outer wall W2. Each support vertical wall 3 has plural air holes 30 spaced apart vertically for air to flow through in the space B. In addition, the outer wall W2 is bored with plural holes 4 in a scope of the sucking plate of a vacuum bag G properly spaced apart for tightly fixing a valve unit 5 in each hole 4.

Each valve unit 5 consists of a T-shaped valve 50 with a threaded rod 500, a plastic buffer gasket 51 with a center hole 510 for the threaded rod 500 to fit through, a seat 52 shaped nearly like a steering wheel fitting around in each hole 4 and combined with the T-shaped valve 50 having a thickness larger than that of the outer wall W1, a center shaft hole 520 for the threaded rod 500 to fit through and plural arms 521 extending radially from a round wall defining the center shaft hole 520 to an outer peripheral wall so as to form plural air passage sections 522 between the arms 521 and the outer peripheral wall.

Further, a spring 53 is provided, located behind the seat 52 and in front of a washer 540 and fitted through by the threaded rod 500 which is to screw with a nut 541 of a screwing means 54.

Figure 5:
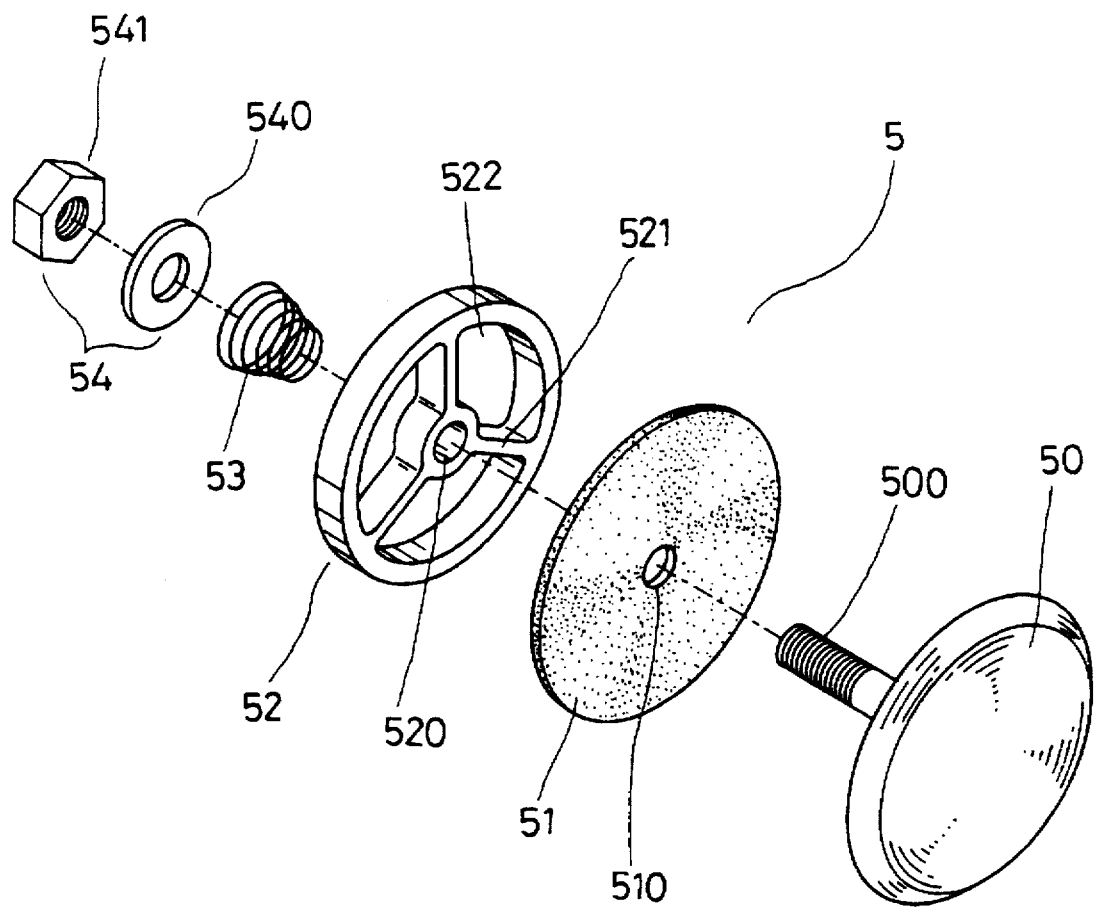
FIG. 5 is an exploded perspective view of a valve unit of the first preferred embodiment of a removing device for an vacuum bag happening behind a ship stern in the present invention.
Figure 6:
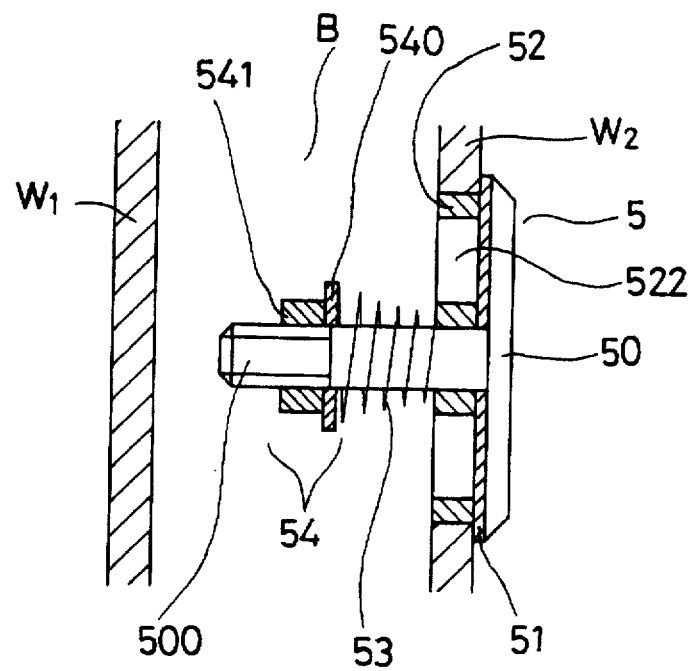
FIG. 6 is a side cross-sectional view of the valve unit of the first preferred embodiment in the present invention.

In assembling the valve unit 5, referring to FIG. 5, firstly, the threaded rod 500 of the T-shaped valve 50 is put through the center hole 510 of the buffer gasket 51, the shaft hole 520 of the seat 52, the spring 53 and washer 540 and screwed with the nut 541 to keep all these components in place firmly. Then each assembled valve unit 5 is fixed with each hole 4 of the outer wall W1, with the seat 52 being fitted around the wall of each hole 4 and then kept together tightly, for example, by means of welding. Then the spring 53 urges the seat 52 and the washer 540 with its elasticity, normally pushing the threaded rod 500 of the T-shaped valve 50 to the outer wall W1 with some force. When there is no external force, such as sucking force of the vacuum bag G, the T-shaped valve 50 firmly contacts with the buffer gasket 51, which tightly contacts the surface of the outer wall W1, as shown in FIG. 6, preventing water from percolating through into the space B, and thus also preventing parasites such as sea flower, kelp, oyster, etc. from growing in the space B to block the passage R.

Figure 7:
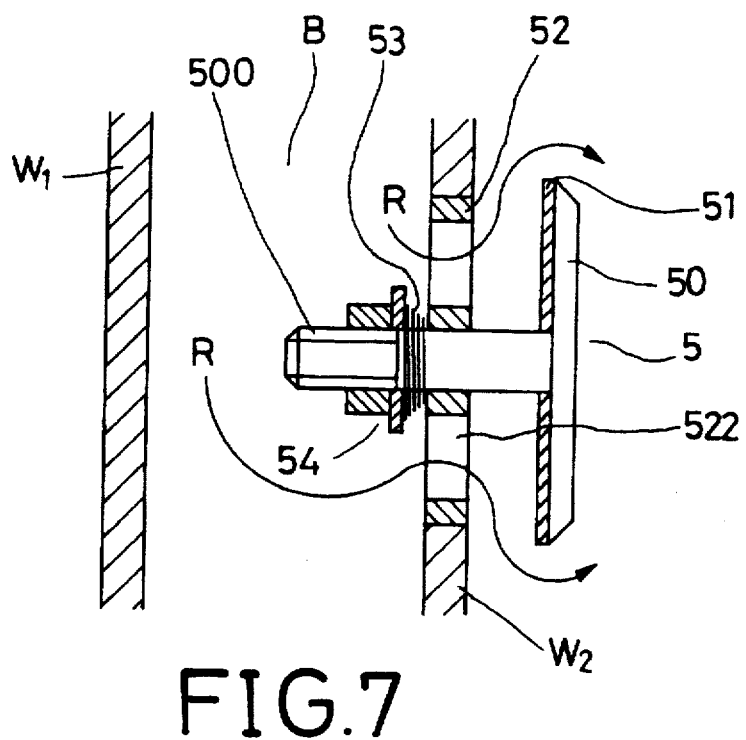
FIG. 7 is another side cross-sectional view of the valve unit of the first preferred embodiment in the present invention, showing it in an opened condition caused by sucking force of a vacuum bag happening behind a ship stern.

Further, the support vertical plates 3 are fixed in the space B, separating the space B into plural sections, and then the sucking windows 2 are covered on the air entrances 1 of the deck F, preventing things from falling into the space B, to keep the passage R clear and open. Thus, open air can flow through the passage R to enter the vacuum bag G. In addition, when the sucking force of the vacuum bag G pushes on the valve units 5, the T-shaped valve 50 is forced to move outward through elasticity of the spring 53, permitting air to flow through the entrances 1, the space B, the passage sections 522 of the seat 52 of the valve units 5 (as shown in FIG. 7) into the vacuum bag G just behind the ship stern A1. Then the vacuum bag G is at once filled with large air bubbles, no longer having sucking force against the stern A1 nor producing pulling force to the ship body.

Figure 8:
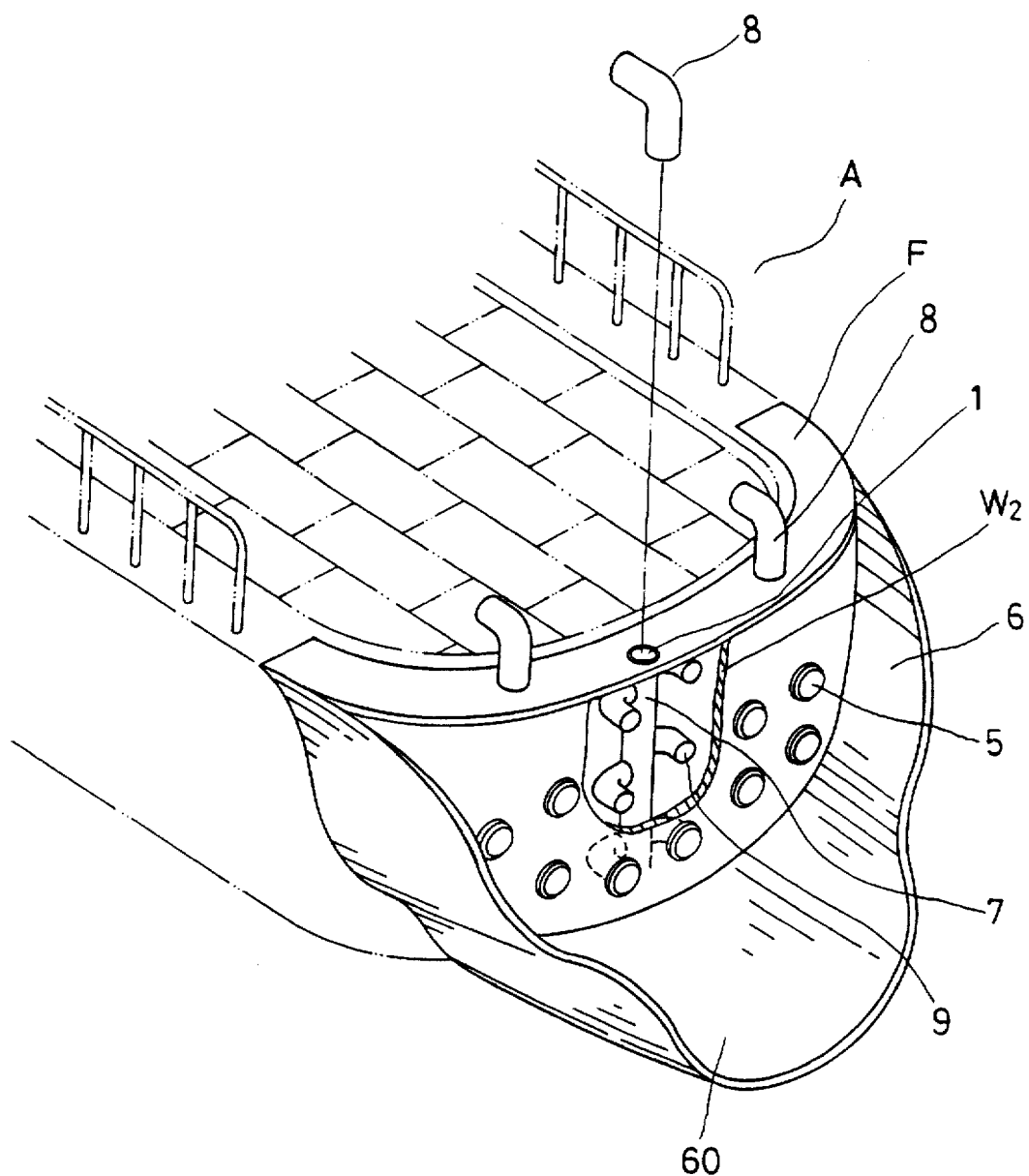
FIG. 8 is a perspective view of a second preferred embodiment of a removing device for an vacuum bag happening behind a ship stern in the present invention; and, FIG. 9 is an exploded perspective view of a passage pipe of the second preferred embodiment in the present invention.

Further, a sloped stop wall 6 is formed to extend slantingly from the bottom of a ship to the rear upper direction, having a projecting bottom 60 shown in FIG. 8 extending to the whole scope of the opening of the trumpet-shaped vacuum bag G. The sloped stop wall 6 can be applied to ships with a single and double rudders and a single and double propelling screws. If the rudders and the propelling screws are located on both sides in two rows, they can be positioned on two sides of the projecting bottom 60. In case the rudder and the propelling screw are located in a single row, they can be located on the projecting bottom 60. Then, if the speed of a ship A is larger than the filling speed of water in the vacuum bag G, the wall of the stern A1 will expose in open air gradually in larger and larger extent until the stern A1 completely exposes in open air, so called a hollow tail condition, resulting in saving a large propelling force.

When the hollow tail condition is produced as soon as possible by provision of the sloped stop wall 6, and pulling backward force of the vacuum bag G is offset by the passages R in the stern A1, a ship may move forward with a speed in proportion to a propelling force, and the maximum navigating speed at present, 45 knots, may not be the maximum limit for ships.

Figure 9:
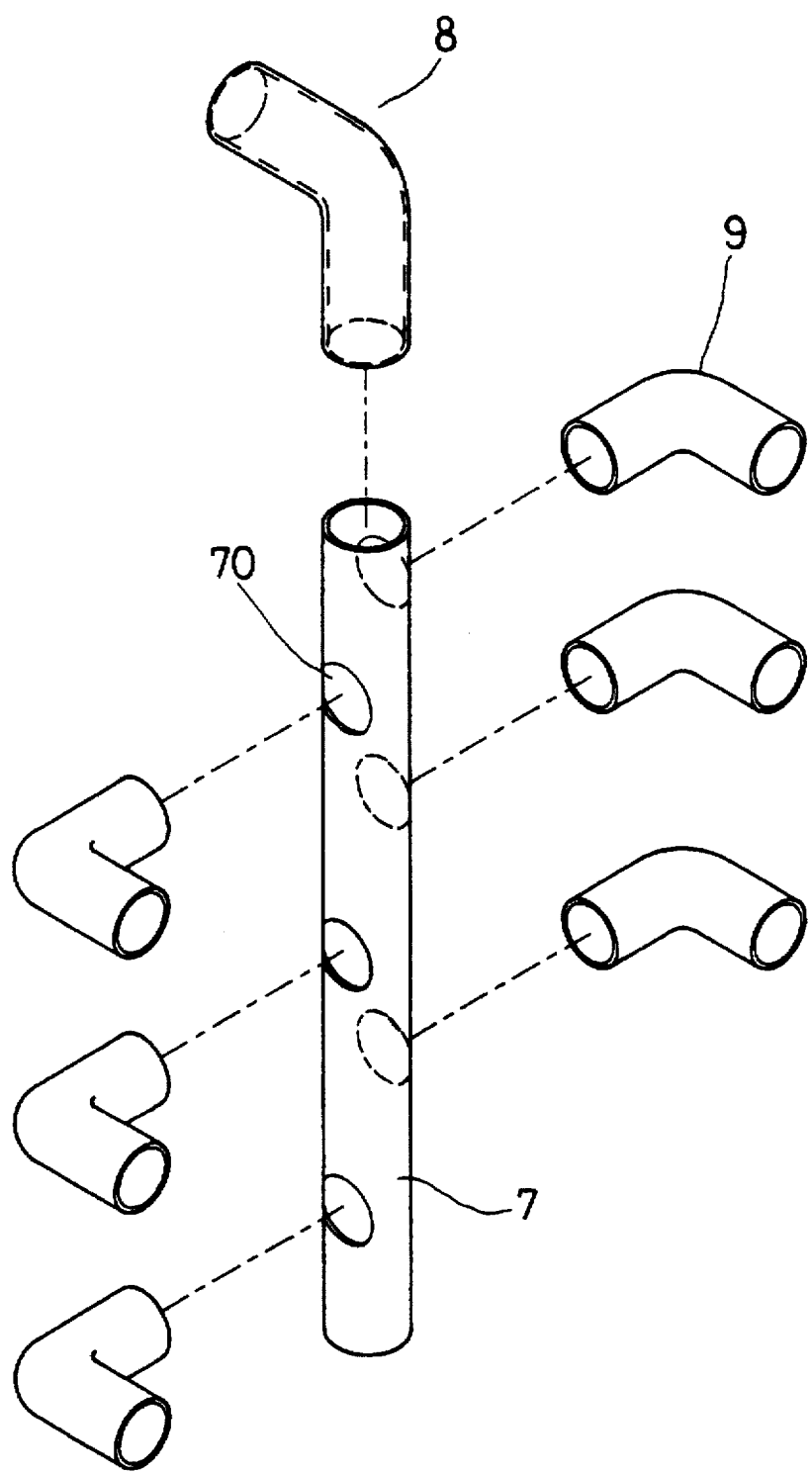

A second preferred embodiment of a device for removing a vacuum bag arising behind the stern in the present invention, as shown in FIGS. 8 and 9, includes a passageway R and a sloped stop wall 6, as in the first preferred embodiment.

The passageway R is formed with an air entrances 1, plural holes 4 bored in an outer wall and plural valve units 5 fitted in the plural holes. The passageway R in the second preferred embodiment has the same function and effectiveness as the first preferred embodiment, but additionally has plural air pipes 7 connected with the air entrances 1, and plural bent air pipes 8 fitted in each entrance 1 and connected with each air pipe 7, and plural L-shaped pipes 9 respectively having on one end fixed with openings 70 of each vertical air pipes 7 and the other end fixed with each holes 4 in the wall of the stern A1.

While the preferred embodiments have been described above, it will be recognized and understood that various modifications may be made therein and the appended claims are intended to cover all the modifications which may fall within the spirit and scope of the invention.

What is claimed is:

1. In a snip, a device for removing a vacuum bag from a stern thereof, comprising an air passageway formed in the stern of said ship for open air flow into said vacuum bag arising just behind said stern so as to diminish suction force of said vacuum bag acting on said stern, said passageway comprising a plurality of air entrances provided in an upper surface of a rear deck of said stern, a space formed between an inner wall and an outer wall of said stern, said space being separated with a plurality of vertical support plates into plural sections, a plurality of holes spaced apart in said outer wall and each provided with a valve unit, and a rearwardly projecting generally upwardly concave stop wall extending aft of the stern from a bottom of said ship, whereby air exhausted from said plurality of openings into an area above said stop wall and aft of said stern diminishing said suction drag caused by said vacuum bag.

2. A device as set forth in claim 1, wherein each said vertical plate has plural air holes formed therein for air flow through said space.

3. A device as set forth in claim 1, wherein said passageway further comprises a plurality of vertical air pipes provided in said space and connected with said air entrances, each said vertical air pipe provided with a plurality of openings, a plurality of L-shaped pipes, each having a first end attached to one of said openings, and a second end attached to one of said holes in said outer wall of said stern.

4. A device as set forth in claim 1, wherein each of said valve units comprises a T-shaped valve, a plastic buffer gasket, a valve seat having a plurality of air passage openings, and a biasing spring retained by a threaded fastener.

5. A device as set forth in claim 3, wherein said air entrances are respectively fixed with a bent air pipe which communicates with each said vertical air pipe, said bent air pipe preventing unwanted debris from falling into said vertical air pipes.

* * * * *